2,726,195

CATALYTIC PROCESS

Raymond N. Fleck, Whittier, and John L. Bills, Long Beach, Calif., assignors to Union Oil Company of California, Los Angeles, Calif., a corporation of California No Drawing. Application July 1, 1952,
Serial No. 296,752

20 Claims. (Cl. 196—50)

This invention relates to catalysts which find use in the petroleum industry for the catalytic conversion of hydrocarbons. The catalysts contemplated in the present invention are of the type comprising a carrier with a catalytic agent distended thereon. This is a continuation-in-part of our copending application Serial No. 642,421, filed January 19, 1946, and now abandoned.

The principal objects of the invention are to provide catalysts which exhibit extremely high catalytic activity, which are comparatively easy to produce, and the particles of which are such as to retain their mechanical strength during extensive usage.

A more specific object of our invention is to provide a class of improved catalytic agents with which catalysts of improved activity may be prepared.

It is a further object of our invention to provide processes for catalytic conversion of hydrocarbons and particularly a hydroforming process wherein the improved catalysts as hereinafter disclosed may be employed.

Other objects and advantages of our invention will become apparent to those skilled in the art as the description thereof proceeds.

The term "conversion," pertaining to the conversion of hydrocarbons carries a broad connotation and includes many specific types of processes. Three important reactions take place in the great majority of these catalytic conversion processes, dehydrogenation, hydrocarbon degradation by carbon-carbon fission and ring closure. Inasmuch as any mechanism advanced for the interpretation of the dehydrogenation reaction must permit a satisfactory formulation of the reverse process of hydrogenation, hydrogenation may be considered to be included under the category of dehydrogenation. Thus under the classification of conversion reactions may be included such processes as aromatization, dehydrogenation, hydrogenation and relative thereto desulfurization, cracking, hydroforming, and the like in which processes one or more of the above types of reactions occur.

In all of these conversion processes there is generally employed a catalyst to accelerate the rate of reaction. Although cracking may constitute an exception to this generalization in the majority of instances catalysts are employed therefor. The catalysts used in such reactions normally comprise a carrier or base such as alumina, silica, magnesia, zirconia, thoria, titania or in general the refractory metal oxides, upon which carrier is distended a catalytic agent. Such catalytic agents include the oxides or other compounds of the heavy metals of atomic No. 22 to 42 including titanium, vanadium, chromium, manganese, iron, cobalt, nickel, copper, zinc, yttrium, zirconium, columbium and molybdenum. For example, in the processes of hydroforming and aromatization such metal oxides as molybdenum oxide, chromium oxide, vanadium oxide, copper oxide, or the like when distended either individually or in combination on a suitable carrier such as alumina are excellent catalysts for the specific reactions necessary to these processes.

In general the catalysts of this nature comprise a major proportion of the desired carrier, i. e., from about 80% to 95% and a minor proportion of a catalytic agent, i. e., from about 5% to about 20%. More specific ranges of catalyst composition may be formulated for individual conversion processes but in general the catalysts used in these processes are of a composition approximating the above percentages. For example, in aromatization operations, particularly those which have been designated as hydroforming, a typical commercially prepared catalyst consisting of about 10% of molybdenum oxide and 90% alumina is capable of increasing the aromatic content of a naphtha boiling in the range of about 200° F. to about 250° F. from about 14% to about 60% by volume at a temperature of about 950° F.

Additional examples of catalysts of the type described and other usages and particular reactions are unnecessary for these catalysts are familiar to those skilled in the art of hydrocarbon chemistry.

The present invention contemplates an improvement in such catalysts through the medium of effecting an improvement in the catalytic agent to be employed therein. Briefly we have found that by preparing in a certain manner an alumina base catalyst containing a primary and a secondary catalytic agent which function in a manner complementary to each other we are able to prepare catalysts for given reactions possessing a higher catalytic activity for that reaction than those catalysts heretofore employed. As primary catalytic agents we employ the oxides of chromium or molybdenum; and as a secondary catalytic agent which induces a higher catalytic activity by virtue of combination with the primary catalytic agents above described, we have found certain of the metal phosphates to be effective. In general those metal phosphates which are the most effective are the phosphates of the heavy metals of atomic No. from 22 to 42. It is not to be understood that we favor the usage of a phosphate and an oxide of the same metal in a given catalyst, for we have found that this is not only unnecessary but in many cases is less beneficial than if the phosphate of another metal is employed.

Thus, in the aromatization of hydrocarbons we have found that the catalytic agent when comprised of an alumina carrier and a primary catalytic agent such as an oxide of molybdenum or chromium in combination with a secondary catalytic agent such as a phosphate of one of the above listed heavy metals, and particularly of zinc or zirconium produces a catalyst superior to one in which the phosphate is not present. The phosphate should be precipitated in a slurry of hydrous alumina; this product should be dried and calcined, and the oxide should be distended thereon by impregnation.

The benefits resulting from usage of the combined catalytic agents of the present invention may be more readily appreciated by reference to the following specific examples.

EXAMPLE I

Three catalysts were prepared employing in each case a comparatively pure alumina gel which was activated during the course of catalyst preparation. The first of these catalysts hereinafter entitled "Catalyst No. 1" was prepared by impregnating said alumina base with molybdenum oxide to give a catalyst of the composition of 11% by weight of molybdenum oxide and 89% by weight of alumina. A second catalyst was prepared by precipitating zinc phosphate $Zn_3(PO_4)_2$ on the hydrous alumina gel followed by drying and activation to give a catalyst hereinafter designated as "Catalyst No. 2" comprising 6.44% by weight of zinc phosphate on the alumina. The third catalyst designated as "Catalyst No. 3" was prepared in the same manner as Catalyst No. 2 followed by the impregnation thereof with molybdenum oxide, which catalyst had a composition of approximately 11.6% by weight of molybdenum oxide, 5.6% by weight of zinc phosphate and 82.8% by weight of alumina. These three catalysts were prepared to compare the activity of the metal oxide-metal phosphate combination catalyst of this invention with the activities of similar catalysts containing only the metal oxide or the metal phosphate alone.

A fourth catalyst (No. 9) was prepared to compare the effect of the phosphates of the present invention with the aluminum phosphate of the prior art, as the secondary catalytic agent, for promoting the catalyst activity. Catalyst No. 9, containing approximately 6.75% by weight of aluminum orthophosphate and 10.33% molybdenum oxide, was prepared by adding the required amounts of aqueous solutions of aluminum nitrate and mono-hydrogen ammonium orthophosphate to a slurry of alumina gel, filtering, drying and calcining to activate as above, and impregnating the molybdenum oxide thereon. Each of these catalysts was tested for catalytic activity by aromatizing a petroleum naphtha boiling in the range of about 200° F. to about 280° F. and containing about 14.3% by volume of aromatics. The conditions used in the aromatization operations were the same in each case and were as follows: Liquid hourly space velocity 1; isothermal block temperature 950° F.; 100 pounds per square inch gage pressure; 3,000 cubic feet of added hydrogen per barrel of feed; and a four hour process period. The results of these runs are tabulated briefly in Table 1 below:

Table 1

| Catalyst Number | 1 | 2 | 3 | 9 |
|---|---|---|---|---|
| Liquid Recovery, Vol. percent of feed | 72.6 | 91.7 | 68.2 | 76.2 |
| Aromatic Concentration in Product, Vol. Percent | 61.9 | 12.8 | 71.8 | 60.6 |
| Aromatic Synthesis, Vol. Percent | 30.5 | Negligible | 34.7 | 31.9 |

It is evident upon comparison of the activities of the first three of the above catalysts that the superiority of the catalyst of our invention is a result not of the catalytic activity of the primary and secondary catalytic agents individually but rather of the effect of the combination of the primary and secondary catalytic agents. It is also apparent from a comparison of catalysts 1, 3 and 9 that the zinc phosphate of the present invention increased the aromatic concentration of the product from about 62% to about 72%, whereas the aluminum phosphate of the prior art had no beneficial effect in this respect. For the aromatization or hydroforming of hydrocarbons we prefer to employ a catalyst comprising from about 1% to about 20% of a heavy metal phosphate and particularly the phosphates of zirconium and zinc together with an oxide of chromium or molybdenum. In such a catalyst the permissible range of both primary and secondary catalytic agents is of about 1.0% to about 20% of each, although we have found that the best results are obtained when employing from about 5.0% to about 15% of each, thereby making a total catalytic agent deposition of from about 10% to about 30% on the preferred alumina carrier. In carrying out the hydroforming reaction or the aromatization reaction we may employ temperatures of from about 800° F. to about 1200° F. and preferably from about 900° F. to about 1100° F. with pressures from about atmospheric to about 500 pounds per square inch and preferably from about 50 pounds to about 250 pounds per square inch, and liquid hourly space velocities of from about 0.2 to about 4.0 and preferably from about 1.0 to about 2.0. In some instances, depending upon the type feed stock employed, the aromatization reaction is more advantageously carried out in the presence of added hydrogen in which case we may employ a hydrogen rich gaseous recycle of from about 1,000 to about 5,000 cubic feet per barrel of feed.

In other instances, however, such as for example the aromatization of paraffinic hydrocarbons, the reaction may be favored by the absence of hydrogen.

The catalyst of our invention should be prepared by first precipitating the secondary catalytic agent, i. e., the metal phosphate in a slurry of the desired alumina carrier, subsequently drying the resultant mixture at a temperature in the range of about 100° F. to about 350° F. and further activating the dried material by calcination in air at a temperature in the range of about 600° C. for a period of approximately two hours. This material comprising the carrier and the secondary catalytic agent is then impregnated with a primary catalytic agent by immersion thereof in a suitable solution whereupon after drying and calcination as above, the primary catalytic agent is distended on the carrier-secondary catalytic agent combination. The catalyst may thus be prepared in the manner of the following example.

EXAMPLE II

To 50 parts of purified hydrous alumina gel containing approximately 5 parts of alumina, on a dry basis, was added a solution of 0.3 part of diammonium hydrogen phosphate in 70 parts of water. The resultant mixture was slurried and there was added thereto a solution of 0.45 part of anhydrous zinc chloride in 5 parts of water. The resultant gel was filtered, slurried with 100 parts of water and filtered again to wash the impurities therefrom. This washing was repeated three times. The washed gel was dried for 16 hours at 110° C. and activated by calcining for six hours at 600° C. The resultant material analyzed 3.23% zinc and 1.32% phosphorus by weight. Approximately 2¼ parts of the calcined mixture was impregnated by immersion thereof in a solution of 0.5 part of ammonium molybdate in 0.2 part of concentrated ammonia and 2.2 parts of distilled water. After draining the excess solution from the catalyst particles the material was again dried at 110° C. and activated by calcining for six hours at 600° C. Subsequent analysis indicated the presence of 11.6% molybdenum oxide.

To show the importance of the use of molybdenum or chromium oxide rather than the closely-related tungsten oxide as the primary catalytic agent, and also to emphasize the importance of the alumina carrier and the above method of preparation, three catalysts Nos. 10, 11 and 12 were prepared, containing chromium oxide, molybdenum oxide and tungsten oxide respectively, as the primary catalytic agent, and all containing copper phosphate as the secondary catalytic agent.

In the preparation of catalysts 10 and 11, purified hydrous alumina gel was suspended in about 4,000 ml. of distilled water, and a solution of approximately 30 gr. of diammonium hydrogen phosphate in 100 ml. of water was added with stirring. To the resulting mixture was added 52 gr. of copper nitrate dissolved in 100 ml. of water, with additional stirring, so as to precipitate the copper phosphate on the alumina gel. The resulting gel was filtered, dried for about 48 hours at 220° F., ground, pelleted, and activated by calcining for 4 hours at 600° C. One portion weighing 253 gr., of the above-prepared copper phosphate-alumina pellets was immersed in a solution of 136.3 gr. of ammonium molybdate in 125 ml. of concentrated ammonium hydroxide and sufficient water to make the total 700 ml. Approximately 198 ml. of the solution was absorbed so as to impregnate the ammonium molybdate on the copper phosphate-alumina carrier. This impregnated material was dried over night at 220° F. and calcined for 5 hours at 600° C. to produce a molybdenum oxide impregnated catalyst hereinafter referred to as catalyst 11.

A second portion, weighing 271 gr., of the above-prepared copper phosphate-alumina pellets was immersed in a solution containing 184.3 gr. of ammonium chromate in sufficient water to make a total of 700 ml. of solution.

Two hundred and twenty-eight ml. of the solution was absorbed so as to impregnate the ammonium dichromate on the phosphate-alumina pellets. This product was dried over night at 220° F. and calcined for 5 hours at 600° C. to produce a chromium oxide impregnated catalyst referred to hereinafter as catalyst 10.

In the preparation of catalyst 12, the base employed was an acid treated feldspar-bauxite mixture, and there was mixed therewith sufficient tungsten oxide and copper phosphate to obtain a finished composition containing the same amount of metal phosphate and metal oxide as in catalysts 10 and 11. Thus ground feldspar was mixed with bauxite in the proportions of 250 gr. of feldspar to 1000 gr. of bauxite. This mixture was acid treated with 1800 gr. of a 10% sulfuric acid for one hour at 120° F., washed with water by decantation three times and on the filter twice, and dried overnight at 230° F. The dried carrier was mixed with 124.8 gr. of tungsten trioxide ($WO_3 \cdot H_2O$) and 80.9 gr. of copper phosphate ($Cu_3(PO_4)_2 \cdot 3H_2O$) so as to obtain a final composition containing 5.6% metal phosphate and 9.0% metal oxide on a dry basis. A small amount of Sterotex and graphite (about 25 gr. each) was added to provide lubrication for the pelleting operation, and the mixture was pelleted. The pellets were dried and calcined by gradually heating them to 600° C. and maintaining them at 600° C. for 2 hours. The composition of this catalyst 12 and catalysts 10 and 11 were as follows in per cent by weight:

|  | 10 | 11 | 12 |
|---|---|---|---|
| Carrier | 85.3 | 84.3 | 85.4 |
| Metal Products | 4.3 | 4.3 | 5.6 |
| Metal Oxide | 10.4 | 11.4 | 9.0 |

The three catalysts prepared as above were tested for activity in a hydrocarbon conversion process carried out at 950° F., 100 pounds per square inch gauge pressure, at a space velocity of 1.0 volume of liquid feed per volume of catalyst per hour in the presence of an added 3000 cubic feet of hydrogen per barrel of hydrocarbon feed, with a four hour process period. All catalysts were tested in this same type of apparatus and with the same feed stock. The feed stock was a naphthenic hydrocarbon fraction boiling in the range of approximately 200° F. to 260° F. The other pertinent characteristics of the feed stock and the corresponding characteristics of the products obtained from the two runs, as well as the percent of aromatics synthesized in the runs are shown in the following tabulations:

| Catalyst |  | 10 | 11 | 12 |
|---|---|---|---|---|
| Carrier |  | Alumina | Alumina | Mixed.[a] |
| Phosphate |  | Copper | Copper | Copper. |
| Oxide |  | Chromium | Molybdenum | Tungsten. |
| Liquid Product: | (Feed) |  |  |  |
| Recovery, Vol. Percent | 100.0 | 80.0 | 75.7 | 95.0. |
| Gravity, API | 55.6 | 49.6 | 45.6 | 54.8. |
| Olefins, Vol. Percent | 0.7 | 6.6 | 3.7 | 4.6. |
| Aromatics, Vol. Percent | 14.3 | 39.3 | 56.3 | 16.4. |
| Synthetic Aromatics [b] Vol. Percent of Feed. | 0.0 | 17.2 | 28.3 | 1.3. |

[a] The mixed carrier is the ground feldspar-bauxite mixture described above.
[b] Volumes of aromatics in product, less volumes of aromatics in feed, per 100 volumes of feed.

The above data show that tungsten catalyst 12 is substantially ineffective for hydrocarbon conversion, the product not being substantially different from the feed. On the other hand the data show that both the chromium and molybdenum catalysts 10 and 11 are extremely effective under the same conditions, the feed being converted from a liquid containing only a minor proportion of aromatics, about 1/7 of its volume, to one containing about 40 to 56% of its volume, of aromatics. The data show that since the same copper phosphate was used in all three catalysts, the very marked difference in activity is due to the use of molybdenum or chromium rather than tungsten, as the oxide; the use of alumina rather than the feldspar-bauxite mixture as the carrier; and the preferred method of preparation described herein rather than the method of simply mixing the ingredients.

A further appreciation of the merits of our invention may be obtained by reference to the following examples:

EXAMPLE III

Several catalysts were prepared to be employed in the aromatization of n-heptane.

Catalyst No. 4, comprising 11.2% by weight of molybdenum oxide and 88.8% by weight of alumina, was prepared by impregnating alumina granules, previously activated by calcination at 600° C. for two hours, with a solution of ammonium molybdate. The impregnated granules were then dried and activated by a second calcination.

Catalyst No. 5, comprising 12.0% by weight of chromium oxide and 88% by weight of alumina, was prepared in the same manner as catalyst No. 4 employing an impregnating solution of chromium nitrate in place of the ammonium molybdate used in the above preparation. This catalyst was tested for comparative purposes as being representative of a typical chromia-alumina aromatization catalyst.

Catalyst No. 6, comprising 5.6% by weight of zinc phosphate, 11.6% by weight of molybdenum oxide and 82.8% by weight of alumina, was prepared by slurrying a solution of diammonium hydrogen phosphate with the alumina gel and adding thereto a solution of zinc chloride to precipitate the metal phosphate on the alumina. The resultant slurry was filtered and washed by resuspension in distilled water and filtration. The wet gel was dried at approximately 110° C. for sixteen hours and activated by calcination for six hours at 600° C. The activated alumina-zinc phosphate preparation was then impregnated with molybdenum oxide in the manner employed in the preparation of catalyst No. 4.

Catalyst No. 7, comprising 2.5% by weight of zirconium pyrophosphate, 11.0% by weight of molybdenum oxide and 86.5% by weight of alumina, was prepared in the same manner as catalyst No. 6 employing zirconyl nitrate to supply the metal ion rather than the zinc chloride.

Each of these catalysts was tested separately for catalytic activity by aromatizing a n-heptane feed at an isothermal block temperature of approximately 1050° F., a space velocity (volumes of liquid feed per volume of catalyst per hour) of 1.0, a gauge pressure of 50 pounds per square inch and with 1500 cubic feet of added hydrogen per barrel of heptane feed. For a four hour process period the following tabulated results were obtained.

Table 2

| Catalyst No. | 4 | 5 | 6 | 7 |
|---|---|---|---|---|
| Liquid Recovery, Vol. Percent of Feed | 50.5 | 72.3 | 41.2 | 46.7 |
| Aromatic Concentration in Product, Vol. Percent | 52.0 | 25.5 | 74.9 | 67.6 |
| Aromatic Synthesis, Vol. Percent | 26.3 | 18.2 | 30.8 | 31.5 |

EXAMPLE IV

To further illustrate the effect of the added metal phosphates, catalysts 4 and 6 of Example II together with a nickel phosphate containing catalyst No. 8 were tested for hydroforming activity.

Catalyst No. 8, comprising 6.5% by weight of nickel phosphate, 11.1% by weight of molybdenum oxide and 82.4% by weight of alumina, was prepared by slurrying a solution of nickel nitrate with the alumina gel from which the foregoing catalysts were prepared and subsequently adding thereto a solution of diammonium hydrogen phosphate to effect the precipitation of the nickel phosphate. From this stage of the preparation to completion of the catalyst the same techniques were employed as were used in the preparation of catalysts 6 and 7.

These three catalysts (4, 6 and 8) were each employed to hydroform a sample of a naphthenic hydrocarbon feed boiling in the range of approximately 200° F. to 260° F. and containing 14.3% aromatic hydrocarbons. The hydroforming runs were carried out at 1,050° F., 50 pounds per square inch gauge pressure, at a space velocity of 1.5 (volumes of liquid feed per volume of catalyst per hour) and in the presence of an added 1,500 cubic feet of hydrogen per barrel of hydrocarbon feed. With a four hour process period the following comparative data were obtained:

*Table 3*

| Catalyst No. | 4 | 6 | 8 |
|---|---|---|---|
| Liquid Recovery, Vol. Percent of Feed | 71.6 | 70.8 | 70.1 |
| Aromatic Concentration in Product, Vol. Percent | 62.8 | 72.8 | 73.3 |
| Aromatic Synthesis, Vol. Percent | 30.7 | 37.3 | 37.1 |

EXAMPLE V

As indicated by the results of the runs on n-heptane described above, the catalysts of this invention are very active for the type of hydroforming sometimes referred to as dehydrocyclization, i. e. conversion of acyclic non-aromatic or aliphatic hyrdocarbons to aromatics. As another example of this, two catalysts were prepared and used for hydroforming of gasoline raffinate, a mixture of saturated aliphatic hydrocarbons prepared by extracting the aromatic hydrocarbons from a gasoline petroleum distillate with sulfur dioxide. This material has a boiling range of about 170 to 380° F. and contains only about 20% naphthenic hydrocarbons and the remainder saturated acyclic hydrocarbons.

Catalyst 13 contained about 3% cobalt phosphate and 10% molybdenum oxide on alumina, and was prepared by precipitating the phosphate in the suspended hydrous alumina, drying and calcining the resulting material, and impregnating thereon the molybdenum oxide. In this case the impregnation was carried out by grinding the dried cobalt phosphate-alumina mixture before calcining, mixing this powder with powdered molybdic acid, pelleting the resulting mixture and calcining the pellets for 2 hours at 600° C., so as to sublime the molybdenum oxide into the carrier-phosphate mixture.

Catalyst 14 contained about 4% nickel phosphate and 8% chromium oxide on alumina, and was prepared by precipitating the phosphate in the suspended hydrous alumina, drying and calcining the resulting material, and impregnating the chromium oxide thereon by immersion in an aqueous solution of ammonium dichromate, drying and calcining to decompose the salt to the oxide.

The above catalysts were used in the hydroforming of the above-described gasoline raffinate at a temperature of about 1000° F., pressure of 50 pounds per square inch gauge, hydrogen rate of 1500 cubic feet per barrel, and 2.0 liquid volumes of feed per volume of catalyst per hour, with the following results:

| Catalyst | 13 | 14 |
|---|---|---|
| Results: | | |
| Yield, Vol. Percent of feed | 65.0 | 70.0 |
| Vol. Percent aromatics in Product | 45.0 | 39.0 |
| Aromatic Synthesis, Vol. Percent | 29.2 | 27.3 |

Results of approximately equal value are obtained by substituting the other iron group (iron, cobalt, and nickel) metal phosphates for the particular iron group phosphates shown above.

Similarly, by substituting titanium phosphate for zirconium phosphate in the above examples, results almost as desirable are obtained.

While the feed stocks described in the above examples were generally of relatively low sulfur content, the catalysts of this invention are equally effective on feed stocks of high sulfur content, whether straight-run or cracked in character. In fact, such stocks are not only improved in aromatic content but are substantially completely desulfurized under the above hydroforming conditions. Similarly, feed stocks containing undesirable nitrogen compounds such as pyridine, quinolines, etc., are substantially denitrogenated under hydroforming conditions. The iron group phosphate-containing catalysts of this invention are particularly effective for such desulfurization and denitrogenation during hydroforming.

Having described and illustrated the improved catalysts of our invention and the hydrocarbon conversion reactions in which they may be employed, and realizing that many modifications thereof may occur to those skilled in the art without departing from the spirit and scope of the invention, we claim:

1. A process for catalytic hydroforming of hydrocarbons which comprises subjecting such hydrocarbons to temperatures in the range of about 800° F. to about 1200° F. under gage pressures in the range of about atmospheric to about 500 pounds per square inch in the presence of a hydrogen rich re-cycle gas in the amount of approximately 1500 to about 6000 cubic feet of hydrogen rich gas per barrel of feed, with a catalyst comprising from about 60% to about 98% of alumina, from about 1% to about 20% of a phosphate of a metal of atomic No. 22 to 42, and from about 1% to about 20% of an oxide of the group consisting of chromium oxide and molybdenum oxide, said catalyst having been prepared by precipitation of the phosphate in a slurry of hydrous alumina, drying and calcining the product, and distending the oxide thereon by impregnation.

2. A process according to claim 1 in which the metal oxide is molybdenum oxide.

3. A process according to claim 1 in which the metal oxide is chromium oxide.

4. A process according to claim 1 in which the metal phosphate is zinc phosphate.

5. A process according to claim 1 in which the metal phosphate is zirconium phosphate.

6. A process according to claim 1 in which the metal phosphate is titanium phosphate.

7. A process according to claim 1 in which the metal phosphate is copper phosphate.

8. A process according to claim 1 in which the metal phosphate is an iron group phosphate.

9. A process according to claim 1 in which the metal phosphate is cobalt phosphate.

10. A process according to claim 1 in which the metal phosphate is cobalt phosphate and the metal oxide is molybdenum oxide.

11. A process according to claim 1 in which the metal phosphate is zirconium phosphate and the metal oxide is molybdenum oxide.

12. A process for catalytic hydroforming of hydrocarbons which comprises subjecting such hydrocarbons to temperatures in the range of about 800° F. to about 1200° F. under gage pressures in the range of about atmospheric to about 500 pounds per square inch in the presence of hydrogen rich re-cycle gas in the amount of approximately 1500 to about 6000 cubic feet of hydrogen rich gas per barrel of feed, with a catalyst comprising approximately 60% to 98% by weight of alumina, approximately 1% to 20% by weight of zinc phosphate and approximately 1% to 20% by weight of molybdenum oxide, said catalyst having been prepared by precipitation of the phosphate in a slurry of hydrous alumina, drying and calcining the product, and distending the oxide thereon by impregnation.

13. A catalyst comprising from about 60% to about 98% of alumina, from about 1% to about 20% of a phosphate of a metal of atomic No. 22 to 42, and from about 1% to about 20% of an oxide of the group consisting of chromium oxide and molybdenum oxide, said catalyst having been prepared by precipitation of the phosphate in a slurry of hydrous alumina, drying and calcining the product, and distending the oxide thereon by impregnation.

14. A catalyst according to claim 13 in which the metal oxide is molybdenum oxide.

15. A catalyst according to claim 13 in which the metal phosphate is zinc phosphate.

16. A catalyst according to claim 13 in which the metal phosphate is zirconium phosphate.

17. A catalyst according to claim 13 in which the metal phosphate is titanium phosphate.

18. A catalyst according to claim 13 in which the metal phosphate is copper phosphate.

19. A catalyst comprising approximately 60% to 98% by weight of alumina, approximately 1% to 20% by weight of zinc phosphate and approximately 1% to 20% by weight of molybdenum oxide, said catalyst having been prepared by precipitation of the phosphate in a slurry of hydrous alumina, drying and calcining the product, and distending the oxide thereon by impregnation.

20. A method of preparing a catalyst which comprises precipitating a phosphate of a metal of atomic No. 22 to 42 in a slurry of hydrous alumina, drying and calcining the product, and distending thereon an oxide of a metal of the group consisting of chromium oxide and molybdenum oxide, by a method involving impregnation.

References Cited in the file of this patent

UNITED STATES PATENTS

| | | |
|---|---|---|
| 1,882,712 | Andrussow et al. | Oct. 18, 1932 |
| 2,349,827 | Mattox | May 30, 1944 |
| 2,363,011 | Michalek et al. | Nov. 21, 1944 |
| 2,422,172 | Smith | June 10, 1947 |
| 2,441,297 | Stirton | May 11, 1948 |
| 2,519,751 | Field | Aug. 22, 1950 |